UNITED STATES PATENT OFFICE.

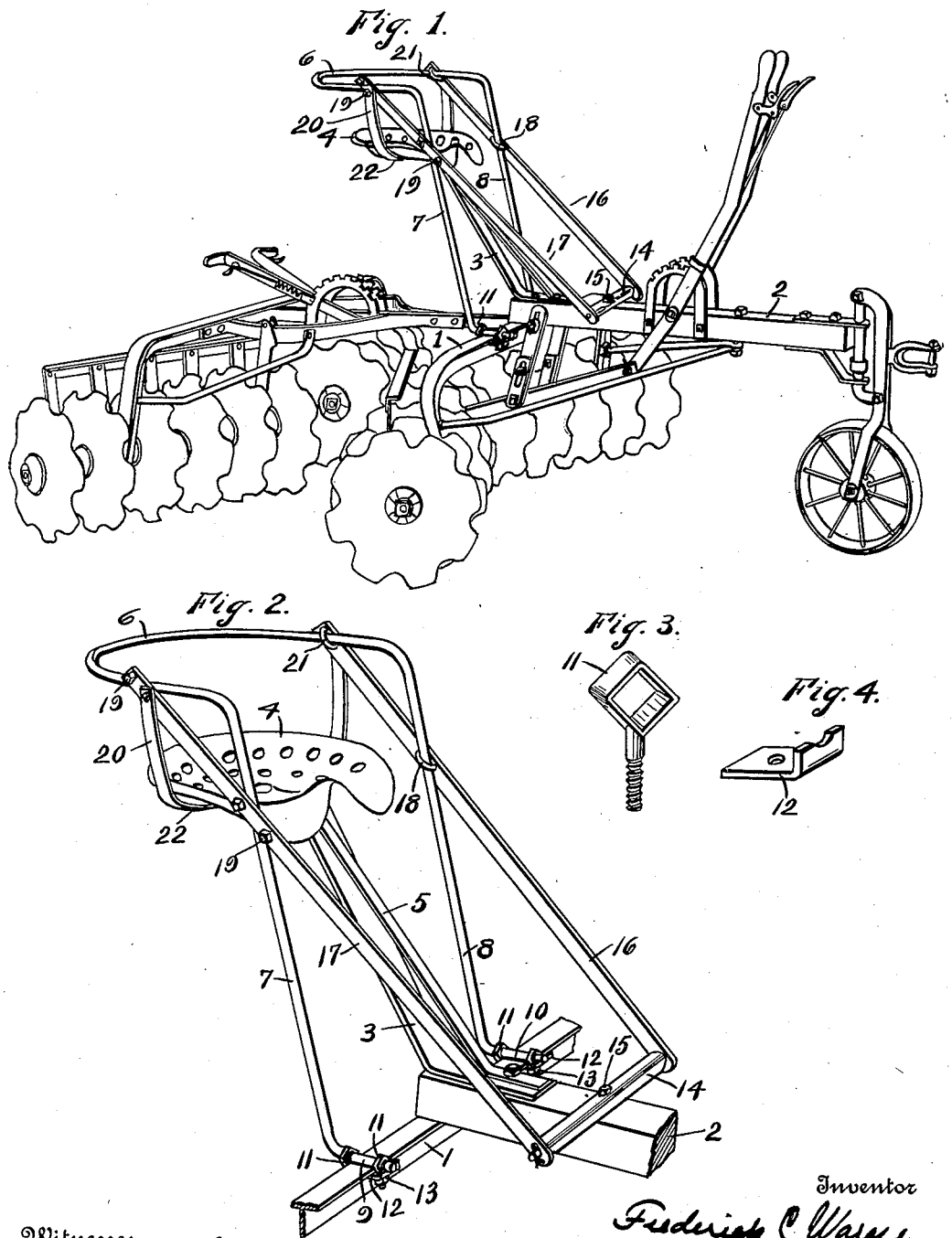

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

SAFETY ATTACHMENT FOR AGRICULTURAL IMPLEMENTS OR THE LIKE.

1,018,461.     Specification of Letters Patent.     Patented Feb. 27, 1912.

Application filed April 1, 1911. Serial No. 618,486.

*To all whom it may concern:*

Be it known that I, FREDERICK C. WARNE, a citizen of the United States of America, residing at Mansfield, in the county of Richland and State of Ohio, have invented certain new and useful Improvements in Safety Attachments for Agricultural Implements or the Like, of which the following is a specification.

My invention relates to a seat guard and is especially adapted to be attached to agricultural implements or the like.

The objects of my invention are to provide a simple and efficient seat guard that protects the driver from injury; to provide means of attaching the guard securely to an agricultural implement or the like and to provide independent means of supporting the driver in case of any defect in the seat or its supporting mechanism. I attain these and other objects by the mechanism illustrated in the accompanying drawing in which:—

Figure 1 is a perspective view of the guard showing it attached to an ordinary double disk harrow. Fig. 2 is an enlarged perspective view of the guard showing the guard surrounding the driver's seat. Fig. 3 shows the clamping bolt. Fig. 4 shows the type of washer used when the guard is clamped to an I beam frame.

In the drawings, reference numeral 1 represents part of the frame of a harrow or the like and 2 the stub tongue. A seat lever 3 is attached to the stub tongue and a seat 4 secured to its free end and an additional brace 5 is provided as shown and forms no part of my invention.

It will be seen that the driver in adjusting his levers and manipulating his implement is always in imminent danger of bodily injury when a guard is not provided, as he is liable to fall from his seat. In order to obviate all danger of injury, I have constructed a guard that can be attached to an implement that will insure safety to the driver, which I will now describe.

A guard 6 is provided and formed to surround the seat except at the front. The supporting portions 7 and 8 depend downwardly at an incline and have their free ends 9 and 10 bent to lie upon the upper surface of the I beam. Socket bolts 11 fit the bent ends of the portions 7 and 8. A plate washer 12 is fitted over the threaded ends of the bolts 11 and projects under the top surface of the I beam. Nuts 13 threadably engage the bolts and when tightened securely retain the guard in place.

A cross-bar 14 is attached to the stub tongue or the like by the bolt 15 and supporting braces 16 and 17 attached to the cross-bar at one end. The opposite ends of the braces 16 and 17 extend in an upward direction and contact with the supporting portions 7 and 8 of the guard and the guard 6 and are securely and rigidly attached thereto by the threaded clips 18 and 21 which clamp the guard and its supporting portions rigidly to the braces when the nuts 19 are tightened.

A bar 20 is attached on its free ends by the clips 21 to the guard 6. The loop portion 22 of bar 20 extends underneath the seat 4 leaving a space between the bottom of the seat 4 and the loop portion 22 to permit downward movement of the seat bar 3 without striking the portion 22.

Attention is called to the fact that if the seat bar 3 broke or its fastening means became defective, the driver would not fall as the seat and driver would be suspended by the looped support 20 independent of the seat supporting means.

What I claim is:—

1. A safety device for agricultural implements or the like comprising a guard provided with supporting portions adapted to be attached to the frame of the machine, a cross-bar, braces attached to each end of the cross-bar and to the guard and its supporting portions.

2. A safety device for agricultural implements or the like comprising a guard provided with supporting portions adapted to be attached to the frame of the machine, a cross-bar, braces attached to each end of the cross-bar and to the guard and its supporting portions, a looped bar suspended from said braces.

3. A safety attachment for agricultural implements or the like comprising a guard partially surrounding the driver's seat having supporting portions rigidly attached to the frame of the machine, braces secured to the guard, its supporting portions, and the frame of the machine.

4. A safety attachment for agricultural implements or the like comprising a guard partially surrounding the driver's seat having supporting portions rigidly attached to the frame of the machine, braces secured to the guard and its supporting portions, a looped support suspended from the guard beneath the bottom of the driver's seat.

5. A safety attachment for the drivers of agricultural implements or the like comprising means to protect the driver from falling from his seat, means to support said protecting means and a means to support the driver in case of any defects in the seat or its supporting mechanism.

6. A safety attachment for the drivers of agricultural implements or the like comprising means to protect the driver from falling from his seat, means to support said protecting means, means to support the driver in case of any defects in the seat or its supporting means, and additional bracing means for adding rigidity and strength to the safety attachment.

7. A safety attachment for agricultural implements or the like to protect the driver, comprising a guard provided with an upper portion substantially semi-circular in form, depending portions having their ends bent to lie flat upon the frame of the machine, means to clamp said bent portions to the frame, and means to brace said safety attachment.

8. A safety attachment for agricultural implements or the like to protect the driver, comprising a guard provided with an upper portion substantially semi-circular in form, depending portions having their ends bent to lie flat upon the frame of the machine, means to clamp said bent portions to the frame, means to brace said safety attachment, and means to support the driver independent of the seat supporting means.

In testimony whereof I affix my signature in presence of two witnesses.

FREDERICK C. WARNE.

Witnesses:
A. B. McLean,
John H. Coss.

Copies of this patent may be obtained for five cents each, by addressing the "Commissioner of Patents, Washington, D. C."